(12) United States Patent
Ammon

(10) Patent No.: US 11,692,589 B2
(45) Date of Patent: Jul. 4, 2023

(54) ELEVATOR INSTALLATION AND A METHOD FOR LUBRICATING BEARINGS IN THE ELEVATOR INSTALLATION

(71) Applicant: Inventio AG, Hergiswil (CH)

(72) Inventor: Urs Ammon, Ebikon (CH)

(73) Assignee: INVENTIO AG, Hergiswil (CH)

( * ) Notice: Subject to any disclaimer, the term of this patent is extended or adjusted under 35 U.S.C. 154(b) by 387 days.

(21) Appl. No.: 16/759,759

(22) PCT Filed: Oct. 23, 2018

(86) PCT No.: PCT/EP2018/078980
§ 371 (c)(1),
(2) Date: Apr. 28, 2020

(87) PCT Pub. No.: WO2019/086295
PCT Pub. Date: May 9, 2019

(65) Prior Publication Data
US 2021/0179387 A1 Jun. 17, 2021

(30) Foreign Application Priority Data

Oct. 31, 2017 (EP) .................................... 17199367

(51) Int. Cl.
*F16C 33/66* (2006.01)
*B66B 11/04* (2006.01)
*F16D 121/06* (2012.01)

(52) U.S. Cl.
CPC ........ *F16C 33/6685* (2013.01); *B66B 11/043* (2013.01); *F16C 33/6659* (2013.01); *F16D 2121/06* (2013.01)

(58) Field of Classification Search
CPC ....... B66B 7/1253; B66B 5/16; B66B 11/008; B66B 11/04; F16C 33/6659; F16C 33/667; F16C 33/6674; F16C 33/6685; F16D 2121/06
See application file for complete search history.

(56) References Cited

U.S. PATENT DOCUMENTS

| 2,076,977 | A | * | 4/1937 | Bush | ........................ | B61F 17/26 |
| | | | | | | 184/29 |
| 4,324,213 | A | * | 4/1982 | Kasting | .................... | F01M 1/10 |
| | | | | | | 184/6.22 |
| 6,125,969 | A | * | 10/2000 | Graf | ........................ | F16N 11/08 |
| | | | | | | 184/26 |
| 2006/0060428 | A1 | * | 3/2006 | Hashiguchi | .......... | H02K 7/1023 |
| | | | | | | 187/254 |

(Continued)

FOREIGN PATENT DOCUMENTS

| CN | 201703945 U | 1/2011 |
| CN | 201963852 U | 9/2011 |

(Continued)

*Primary Examiner* — Minh Truong
(74) *Attorney, Agent, or Firm* — William J. Clemens; Shumaker, Loop & Kendrick, LLP

(57) ABSTRACT

An elevator installation and a method for lubricating bearings in an elevator hoist machine of the elevator installation ensure that during start-up and subsequent running of the elevator hoist machine the bearings are provided with a mixed film lubrication or an elastohydrodynamic lubrication to optimize bearing life expectancy.

13 Claims, 5 Drawing Sheets

(56) References Cited

U.S. PATENT DOCUMENTS

2011/0303491 A1\* 12/2011 Jenkins ................. F16C 17/24
                                                          184/7.4
2016/0340152 A1    11/2016 Strbuncelj
2017/0349405 A1\* 12/2017 Ammon ................. B66B 3/002

FOREIGN PATENT DOCUMENTS

| CN | 204342232 U   | 5/2015  |
|----|---------------|---------|
| CN | 106115524 A   | 11/2016 |
| JP | S56101436 A   | 8/1981  |
| WO | 2014193728 A1 | 4/2014  |
| WO | 2016097241 A1 | 6/2016  |

\* cited by examiner

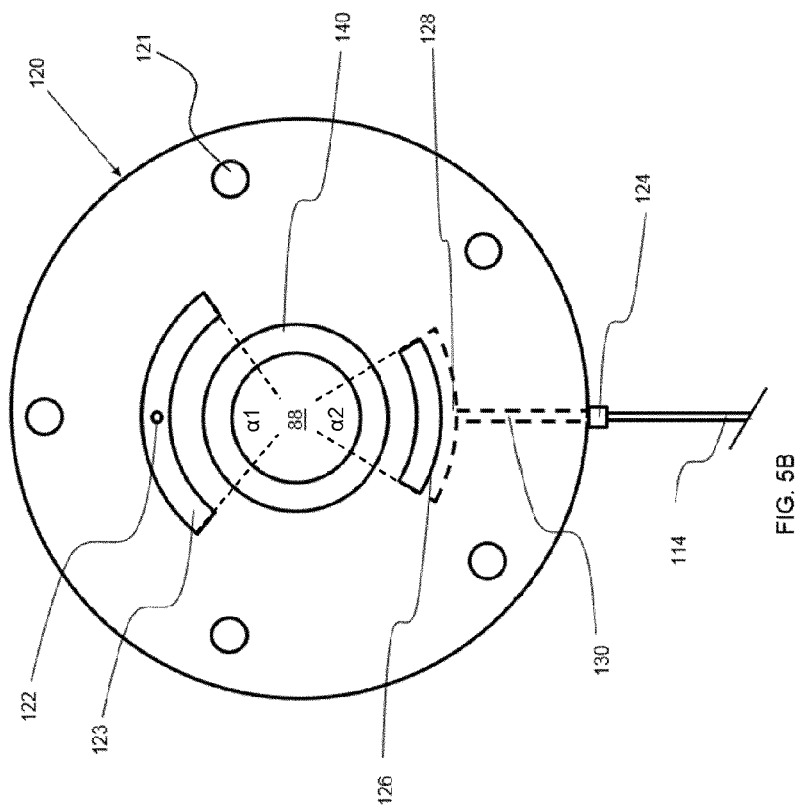
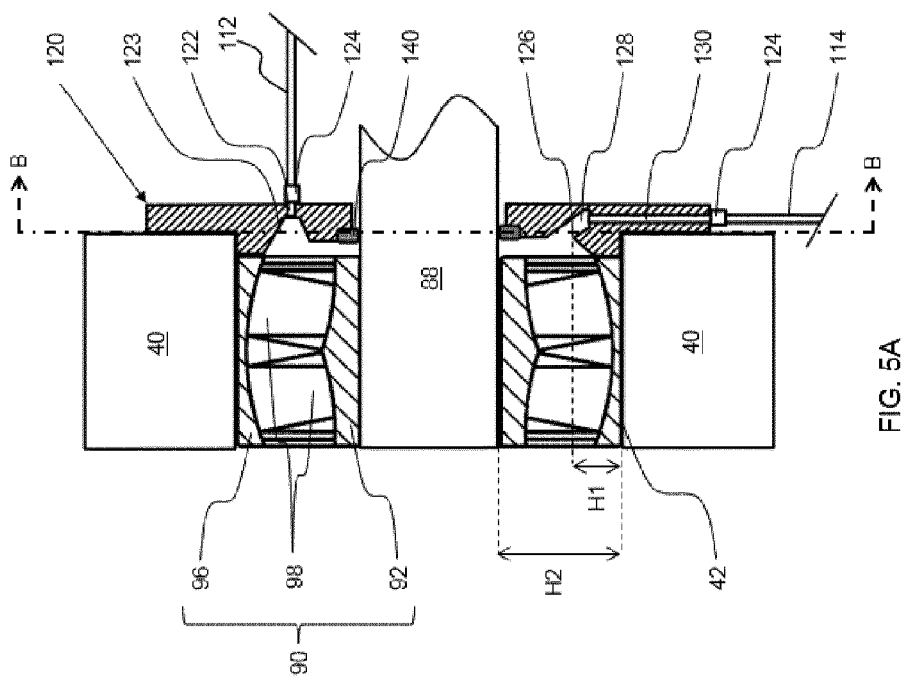

ELEVATOR INSTALLATION AND A METHOD FOR LUBRICATING BEARINGS IN THE ELEVATOR INSTALLATION

FIELD

The present disclosure relates to elevators and to a method for lubricating bearings in elevator hoist machines.

BACKGROUND

Conventionally, bearings are employed within an elevator hoist machine to reduce friction between moving parts. For example, a rotating shaft of the elevator machine may be supported by means of bearings mounted within one or more stationary pedestals. Thereby the bearings, while permitting relative rotation of the shaft with respect to the supporting pedestals, can transfer radial and axial loads from the shaft to the pedestals.

A lubricant is normally employed to reduce friction in the bearings which is a highly important factor for improving efficiency, reducing wear, facilitating extended use at high speeds and avoiding overheating and premature failure of the bearing. When lubrication breaks down, components can rub destructively against each other, causing heat, local welding, destructive damage and ultimate failure.

For elevator hoist machines, which represent a relatively slow-speed and high-load application, greases are the most commonly used bearing lubricants. Typically, in operation, the elevator bearings will function under conditions of complete boundary lubrication according to the tribology/Stribeck curve which can lead to reduced bearing life. Elevator bearings supplied with grease are usually re-lubricated periodically, for example after 3000 operating hours, using a manually operated grease gun. Furthermore, as grease cannot simply be drained, the elevator machine and the bearing may have to be disassembled to remove any contaminated grease.

More recently, as exemplified in WO2014/193728 and US2016/0340152, the use of oil has been proposed as a lubricant for elevator machine bearings. Both publications describe an oil bath lubrication for the elevator bearings in which the outer raceway of the bearing is submerged in oil. In operation the oil, which is picked up by the outer raceway of the bearing, is distributed within the bearing and then flows back to a sump or bath in the housing. A shield is provided to prevent oil leaking through to and contaminating critical surfaces within the elevator machine such as the brake discs. The advantage of oil over grease as a lubricant derives primarily from its film-forming capacity, that is, its capability to maintain a film of oil between the bearing surfaces. In operation, mixed or full film lubrication is achievable using oil as the lubricant for elevator machine bearings. However, at standstill, oil film is eliminated between the components of the bearings that are not emerged in the oil sump. Accordingly, on start-up of the elevator machine, these bearing components, which transfer substantial radial loads from the elevator, may not be adequately coated in oil and thereby endure significantly higher friction and wear.

Another disadvantage of oil bath lubrication of elevator bearings as described above is that the oil is effectively sealed or contained within the bearing such that during operation the temperature of the contained oil will inherently increase which could result in an increase in friction and the rate of metal transfer. Excessive temperatures will eventually result in metal-to-metal contact within the bearing without any benefit of oil lubrication.

SUMMARY

An objective of the present invention is to overcome the disadvantages of the prior art discussed above by providing an elevator installation and a method for lubricating bearings in an elevator hoist machine such that during start-up and subsequent running of the elevator hoist machine the bearings are provided with a mixed film lubrication or an elastohydrodynamic lubrication to optimize bearing life expectation.

Accordingly, the invention provides an elevator installation having an elevator controller, a drive and a hoist machine, wherein the hoist machine comprises a traction sheave, an electric motor to rotate the traction sheave, a brake, one or more bearings supporting the traction sheave and a lubrication device automatically transmitting oil to the bearings upon receipt of a brake release signal from the drive or the controller.

The brake release signal provides an indication that the elevator installation is required to make a trip and by pumping bearing lubrication oil to the bearing at the start of each elevator trip, the bearings can be provided with a mixed film lubrication or an elastohydrodynamic lubrication before they actually start to rotate and not only during subsequent running of the elevator hoist machine. The life expectancy of the bearings can thereby be optimized since overheating and premature failure of the bearing can also be avoided. This in turn leads to the advantageous effects of improving the efficiency of and reducing wear within the elevator hoist machine facilitating extended use at high speeds. Furthermore, through using the automatic lubricating device, the frequency of routine maintenance for the machine can be reduced and the maintenance procedure itself is simplified and quicker as the technician has merely to replenish or replace the bearing oil in an oil reservoir.

Excessive oil within the bearing results in churning and deteriorates the effectiveness of oil lubrication. In order to prevent this, the lubrication device automatically transmits oil to the bearing for a certain short period only and preferably is deactivated before the machine starts to rotate the traction sheave. To achieve this the lubrication device can be provided with a timer which activates the lubrication device for a preset time duration after receipt of the brake release signal from the drive or the controller. The length of the preset time duration can be adjusted to take into account elevator specific factors such as the rated load, velocity and acceleration of the elevator installation, device specific factors such as delivery pressure to the bearing, as well as lubricant specific factors such as viscosity of the oil as well as the presence and type of extreme pressure EP additive mixed to the oil.

In another example, the automatic lubrication device can be deactivated upon receipt a signal from a brake contact confirming that the brake is open.

Alternatively, the lubrication device can be deactivated upon receipt of a further brake release signal from the drive or the controller.

Preferably, the brake is hydraulically released and the elevator installation further comprises a pump and a solenoid valve whereby the pump is activated by the brake release signal to deliver hydraulic fluid from a reservoir to the solenoid valve and the solenoid valve is activated by the further brake release signal to deliver the pressurized fluid further to the brake.

The automatic lubrication device may comprise an inline oil pump to transfer bearing lubrication oil from an oil reservoir, through an oil feed pipe to the bearing. Similarly, an oil return pipe can be provided to drain excessive lubrication oil from the bearing to an oil reservoir. In such an example, the continual drain-off of excess oil through the oil return pipe and the periodic top-up of lubricating oil in the bearings through the oil feed pipe on each start of the hoisting machine, ensures firstly that there is always an appropriate amount of oil within the bearing at all times and secondly that the oil within the bearings is replenished regularly which enables its temperature to be regulated more effectively so as to keep the bearings cool but also assists in flushing dirt or other contamination away from the bearings.

To further assist in cooling the excess oil returned to the reservoir, a cooler can be provided in the oil return pipe between the bearing and the oil reservoir. The cooler may be passive or actively assisted for example with a fan.

In a specific example the elevator installation further comprises a bearing end cap having an oil diffuser extending in an arc in an upper portion thereof. Alternatively, the bearing end cap could have a plurality of nozzles arranged in an arc in an upper portion thereof. Accordingly, oil can be transmitted by the automatic lubrication device to the bearing via the oil diffuser or the nozzles and sprayed throughout the extent of the arc defined by the oil diffuser or nozzles to coat the rollers positioned within the upper region of the bearing. Gravity will induce excess oil to coat rollers positioned lower within the bearing.

Preferably, the angle is at least 90°.

Additionally, the bearing end cap further comprises an oil drainage channel separated from the bearing by a flange in a lower portion thereof. Accordingly, any oil accumulating in the lower portion of the bearing in excess of the height of the flange will automatically overflow into the oil drainage channel and from there back the lubrication device. Excessive oil within the bearing results in churning and deteriorates the effectiveness of oil lubrication. The height of the flange will depend on the characteristics and properties of the bearing oil used but is preferably less than half the thickness of the annulus formed by the bearing.

As with the oil diffuser in the upper part of the bearing end cap, the flange and the oil drainage channel can extend through an arc in the lower section of the end cap. The extent of the angle of the arc should be great enough to permit any dirt or contamination in the oil to easily flow over the flange and into the oil drainage channel without causing blockage. Preferably, the angle is less than 45°.

At the opposite end of the oil drainage channel, a reservoir for passive oil cooling may be implemented.

The present invention also provides a method for oil lubrication of one or more bearings in an elevator hoist machine comprising the steps of monitoring an elevator brake release signal from an elevator controller or a drive and delivering oil to the bearing when the elevator brake release signal has been detected. The brake release signal provides an indication that the elevator installation is required to make a trip and by pumping lubrication oil to the bearing at the start of each elevator trip, the bearings can be provided with a mixed film lubrication or an elastohydrodynamic lubrication before they actually start to rotate and not only during subsequent running of the elevator hoist machine. The life expectancy of the bearings can thereby be optimized since overheating and premature failure of the bearing can also be avoided. This in turn leads to the advantageous effects of improving the efficiency of and reducing wear within the elevator hoist machine facilitating extended use at high speeds. Furthermore, by using the method, the frequency of routine maintenance for the machine can be reduced and the maintenance procedure itself is simplified and quicker as the technician has merely to replenish or replace the bearing oil in an oil reservoir.

To prevent churning of the oil within the bearing, the oil is transmitted to the bearing for a certain short period only and the delivery is stopped before the machine starts to rotate. To achieve this, the method can include the step delivering oil to the bearing for a preset time duration only after receipt of the brake release signal from the drive or the controller. The length of the preset time duration can take into account elevator specific factors such as the rated load, velocity and acceleration of the elevator installation, device specific factors such as delivery pressure to the bearing, as well as lubricant specific factors such as viscosity of the oil as well as the presence and type of extreme pressure EP additive mixed to the oil.

Alternatively, the delivery of oil to the bearing can be stopped once a signal from a brake contact confirms that an elevator brake is open.

In another example, the delivery of oil to the bearing can be stopped once a further brake release signal is detected.

Preferably any excess oil is automatically drained from the bearings. In such an example, the continual drain-off of excess oil and the periodic top-up of lubricating oil in the bearings on each start of the hoisting machine, ensures firstly that there is always an appropriate amount of oil within the bearing at all times and secondly that the oil within the bearings is replenished regularly which enables its temperature to be regulated more effectively so as to keep the bearings cool but also assists in flushing dirt or other contamination away from the bearings.

DESCRIPTION OF THE DRAWINGS

The disclosure refers to the following figures:

FIG. 5A is an exploded, axial cross-section of the bearing mounted in the second support pedestal of the hoist machine of FIG. 3A; and FIG. 5B is a plan view along line B-B of the bearing end cap illustrated in FIG. 5A.

DETAILED DESCRIPTION

Figure 1:
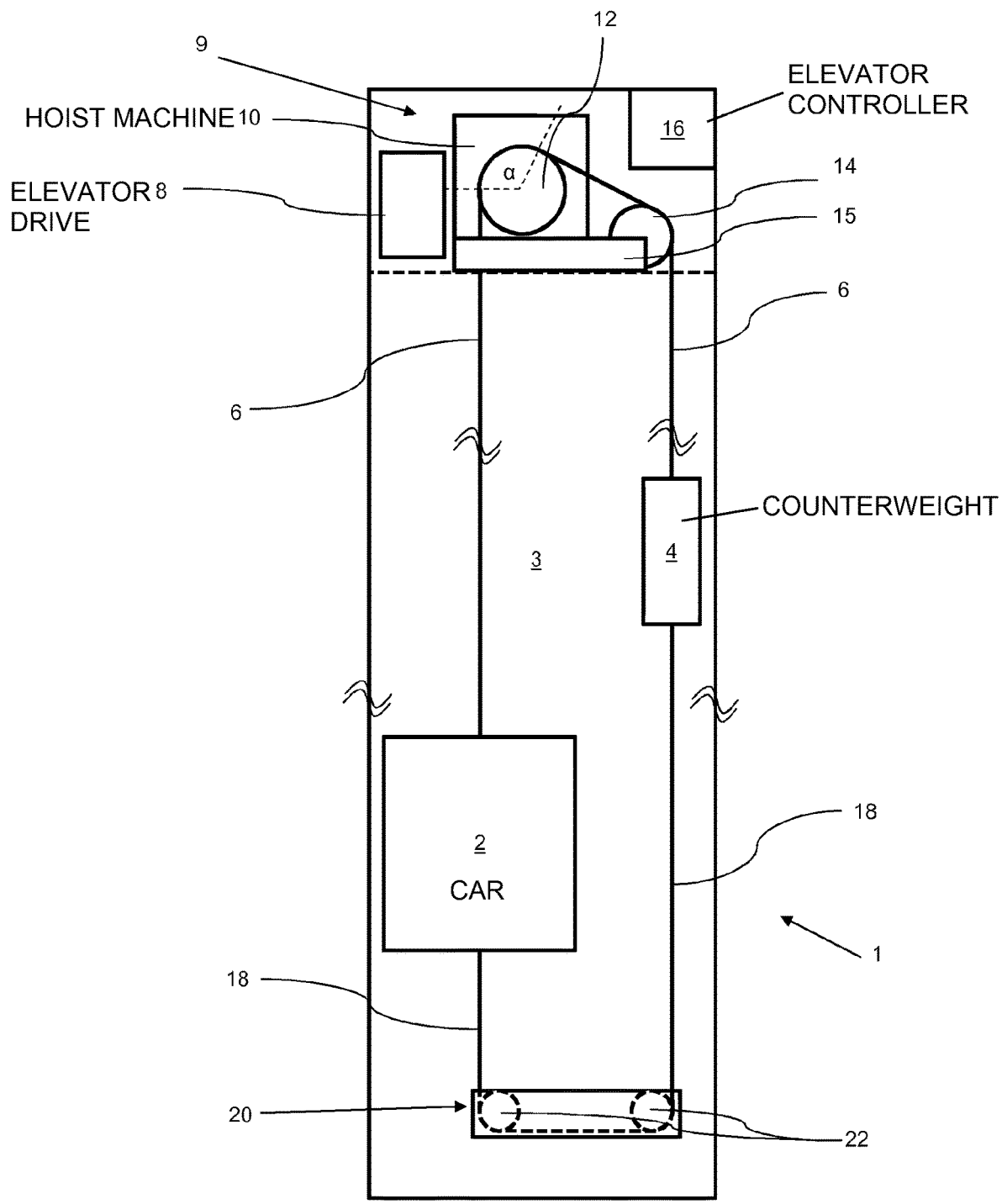
FIG. 1 is an exemplary schematic showing an arrangement of components within an elevator installation according to the present invention.

FIG. 1 illustrates an exemplary embodiment of an arrangement of components within a typical high-rise elevator installation 1. An elevator drive 8, a hoist machine 10, a deflection pulley 14 and an elevator controller 16 are arranged in a machine room 9 above a hoistway 3. Within the hoistway 3, an elevator car 2 and a counterweight 4 are supported on suspension ropes 6. In this example, the suspension ropes 6 have a 1:1 roping ratio whereby they extend from an end connection fixed to the car 2 up the hoistway 3 for engagement through a wrap angle α with a traction sheave 12 which is rotated by the hoist machine 10 under the influence of electrical signals from the elevator drive 8. The ropes 6 are subsequently passed over the deflection pulley 14 and back down the hoistway 3 to a further end connection fixed to the counterweight 4. Naturally, the skilled person will easily appreciate other roping arrangements, such as 2:1, 4:1 or x:1 roping ratios, are equally possible and the invention can also be implemented with elevators using belts instead of conventional suspension ropes.

Preferably, the counterweight 4 is designed so that its total mass is equal to the sum of the mass of the empty elevator car 2 plus 40-50% of the nominal rated load.

In high-rise applications particularly, not only must the imbalance between the car 2 and counterweight 4 be considered, but also the imbalance caused by the weight of the suspension ropes 6 is appreciable. For example, if the car 2 is at the lowest landing within the hoistway 3 and thereby the counterweight 4 is at high level within the hoistway 3, the majority of the length of the suspension ropes 6 is located on the car side of the traction sheave 12 rather than on the counterweight side of the sheave 12. To offset this imbalance due to the suspension ropes 6 it is conventional practice to install one or more compensation chains or ropes 18 suspended between the car 2 and the counterweight 4. For convenience only one compensation rope 18 is illustrated in the drawing, but it will be appreciated that more than one compensation rope can be installed. The compensation rope 18 is guided under pulleys 22 in a weighted pulley box 20 located in a pit of the hoistway 3.

Accordingly, the suspension ropes 6, the car 2, the counterweight 4 and the compensation rope 18 form a closed-loop system where the length of the suspension ropes 6 and compensation rope 18 on the car side of the traction sheave 12 is substantially equal to that on the counterweight side of the traction sheave 12.

Considering the substantial vertical load that is continuously exerted on the traction sheave 12 and the deflection pulley 14 by the elevator 1, the hoist machine 10 and the deflection pulley 14 are structurally supported within the machine room 9 between two steels beams 15 or concrete plinths.

In normal operation, the elevator controller 16 receives signals from conventional landing operating panels and car operating panels (not shown) to determine the travel path that the elevator 1 must undertake in order to satisfy passengers' travel requests. Once the travel path has been determined, the controller 16 outputs signals to the drive 8 so that the traction sheave 12 can be rotated by the hoist machine 10 in the appropriate direction to undertake the travel request. The traction sheave 12 engages with the suspension ropes 6 to vertically move the car 2 and the counterweight 4 in opposing directions along guiderails (not shown) within the hoistway 3.

Figure 2:
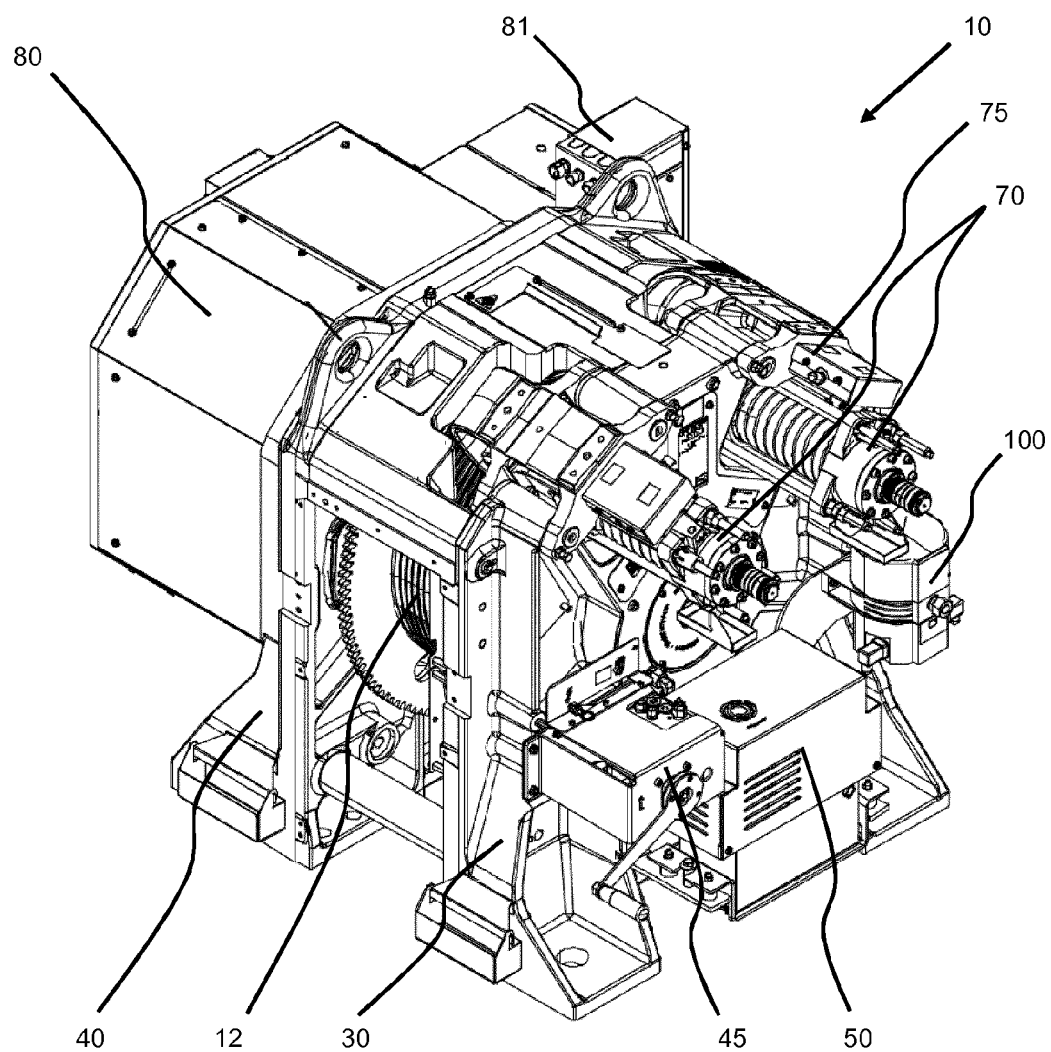
FIG. 2 is perspective view of an elevator hoist machine according to the present invention.

FIG. 2 is perspective view illustrating the mains components of the hoist machine 10 of FIG. 1. The machine 10 is provided with a first support pedestal 30 and a second support pedestal 40 which are secured to and transfer forces to the two steel beams 15 or concrete plinths, respectively, within the machine room 9. The traction sheave 12 which engages with the suspension ropes 6 is mounted to on a rotatable shaft between the two support pedestals 30 and 40.

The first support pedestal 30 is also referred to as the brake-side pedestal as is carries two hydraulic brake calipers 70, an automatic hydraulic brake release unit 50, a manual brake release unit 45 and an automatic lubrication device 100. The position of each of the brake calipers 70 is monitored by one or more brake contacts 75.

On the other side of the hoist machine 10, the second support pedestal 40 bears the electric motor 80 and a terminal box 81 containing inter alia electrical power supply terminals for the machine 10 as well as connectors for transmitting signals to and from the drive 8 and the elevator controller 16 ensuring that the machine 10 operates in accordance with the requested travel pattern to satisfy the travel requests received by the elevator controller 16. The method of operating the hoist machine in order to satisfy elevator passenger requests will be explained further with respect to the flowchart illustrated in FIG. 4.

FIG. 3A is an axial cross-section of the elevator hoist machine 10 of FIG. 1 and FIG. 2. The motor 80 comprises a stationary stator 82 mounted to and enclosed within a housing 84. The stator 82 circumferentially surrounds a rotor 86 that is secured to one end of a shaft 88. The shaft 88 extends from the electric motor 80, through the second pedestal 40 and across to the first pedestal 30. The shaft 88 is support by bearings 90 mounted within the stationary pedestals 30 and 40 to permit relative rotation of the shaft 88 with respect to the supporting pedestals 30 and 40. The traction sheave 12 is secured for concurrent rotation with the shaft 88 between the two pedestals 30 and 40. Forces imposed on the traction sheave 12 due to the substantial weight of the elevator 1 suspended therefrom are transmitted from the traction sheave 12, through the shaft 88 and subsequently transferred by the bearings 90 to the supporting pedestals 30 and 40. A brake disc 13 is attached to or integrated with the traction sheave 12 at a side facing towards the first, brake-side support pedestal 30. The brake disc 13 is positioned between the brake calipers 70 mounted on top of the first pedestal 30.

FIG. 3B is a schematic of the automatic hydraulic brake release unit 50. To avoid unnecessary repetition, the following describes the automatic brake release unit 50 and its hydraulic circuit feeding a brake cylinder 72 within one of the brake calipers 70 depicted in FIG. 2. It will be understood that the other brake caliper 70 is connected to an outlet port 64 of the brake release unit 50 in an identical manner.

The automatic brake release unit 50 comprises a valve block 51 mounted on a reservoir 56 containing hydraulic fluid. Fluid output ports 64 on the valve block 51 are connected by hydraulic ducts 66 to the brake cylinder 72.

In response to a brake release signal R1 from either the drive 8 or the elevator controller 16, an electric motor 54 operates a circulating pump 52 to deliver pressurized fluid from the reservoir 56 through check valves 60. The pressure of the fluid is regulated by a pressure limiting valve 58. Depending on the operating state of a 2/2 way solenoid valve 62 controlled by a further signal R2 from the drive 8 or the elevator controller 16, the pressurized fluid will be either drained back to the reservoir 56 or delivered to the outlet port 64 and further onto the brake cylinder 72 to release or disengage the brake caliper 70 from the brake disc 13 against the biasing force of a compression spring within the brake cylinder 72. The above discussion is a summary to the construction and operation of the automatic brake release unit 50. Further details, particularly on its operation in conjunction with the manual brake release unit 45 of the hoist machine 10, can be retrieved from publication US2016/0332844.

FIG. 3C illustrates the lubrication device 100 for the elevator bearings 90. For ease of reference, the drawing depicts only oil feed and oil return pipes 112 and 114 interconnecting the lubrication device 100 to the bearing 90 provided in the first support pedestal 30. It will be appreciated that oil feed and oil return pipes 112 and 114 are also arranged between the lubrication device 100 and the other bearing 90 mounted in the second support pedestal 40 which is illustrated by the dashed circle A and which will be described in further detail with respect to FIGS. 5A and 5B.

The automatic lubrication device 100 contains an electric motor 104 and a circulating pump 102 together making up a low pressure inline oil pump to transfer bearing lubrication oil from an oil reservoir 106, through a check valve 107, a filter 108, an outlet port 110 and through an oil feed pipe 112 to the top of the bearing 90.

As with the automatic hydraulic brake release unit 50 of FIG. 3B, the motor 104 is activated in response to a brake release signal R1 from either the drive 8 or the elevator controller 16. However, in this instance the motor 104 does not operate continuously until the signal R1 is removed, but instead the motor 104 of the automatic lubrication device 100 is operated, for example, by a timer that is triggered by the brake release signal R1 to operate for a preset time duration Δt only. The length of the preset time duration Δt will take into account elevator specific factors such as the rated load, velocity and acceleration of the installation 1, pump specific factors such as delivery pressure to the bearing 90, as well as lubricant specific factors such as viscosity of the oil as well as the presence and type of extreme pressure EP additive mixed to the oil.

Excessive lubrication oil is continually drained back from the bottom of the bearing 90 to the oil reservoir 106 through an oil return pipe 114 connected to a return port 116 in the lubrication device 100.

Optionally, a cooler 118 can be incorporated in the oil return pipe 114 between the bearing 90 and the oil reservoir 106 to remove heat from the oil. The cooler 118 can be active as illustrated in FIG. 3C or passive.

Not only is oil a superior bearing lubricant over grease for its film-forming capacity but it also has the benefit of absorbing a significant amount of the heat generated from the bearings 90. However, if the oil is sealed or contained within the bearings as described in the oil bath lubrication systems of US2016/0340152 or WO2014/193728 its temperature will understandably rise during operation. Such a rise in temperature can lead to a deterioration of the lubricant and thereby to an increase in both the friction and the rate of metal transfer within the bearings 90.

In the present example, the continual drain-off of excess oil through the oil return pipe 114 and the periodic top-up of lubricating oil in the bearings 90 through the oil feed pipe 112 on each start of the hoist machine 10, ensures that the oil within the bearings 90 is replenished regularly which enables its temperature to be regulated more effectively so as to keep the bearings 90 cool but also assists in flushing dirt or other contamination away from the bearings 90. Furthermore, by pumping bearing lubrication oil to the top of the bearings 90 at the start of each elevator trip, the bearings 90 can be provided with a mixed film lubrication or an elasto-hydrodynamic lubrication before they actually start to rotate and not only during subsequent running of the elevator hoist machine 10. The life expectancy of the bearings 90 can thereby be optimized since overheating and premature failure of the bearings 90 can also be avoided. This in turn leads to the advantageous effects of improving the efficiency of and reducing wear within the elevator hoist machine 10 facilitating extended use at high speeds. Furthermore, through using the automatic, lubrication device 100, the frequency of routine maintenance for the machine 10 can be reduced and the maintenance procedure itself is simplified and quicker as the technician has merely to replenish or replace the oil in the reservoir 106.

Figure 4:
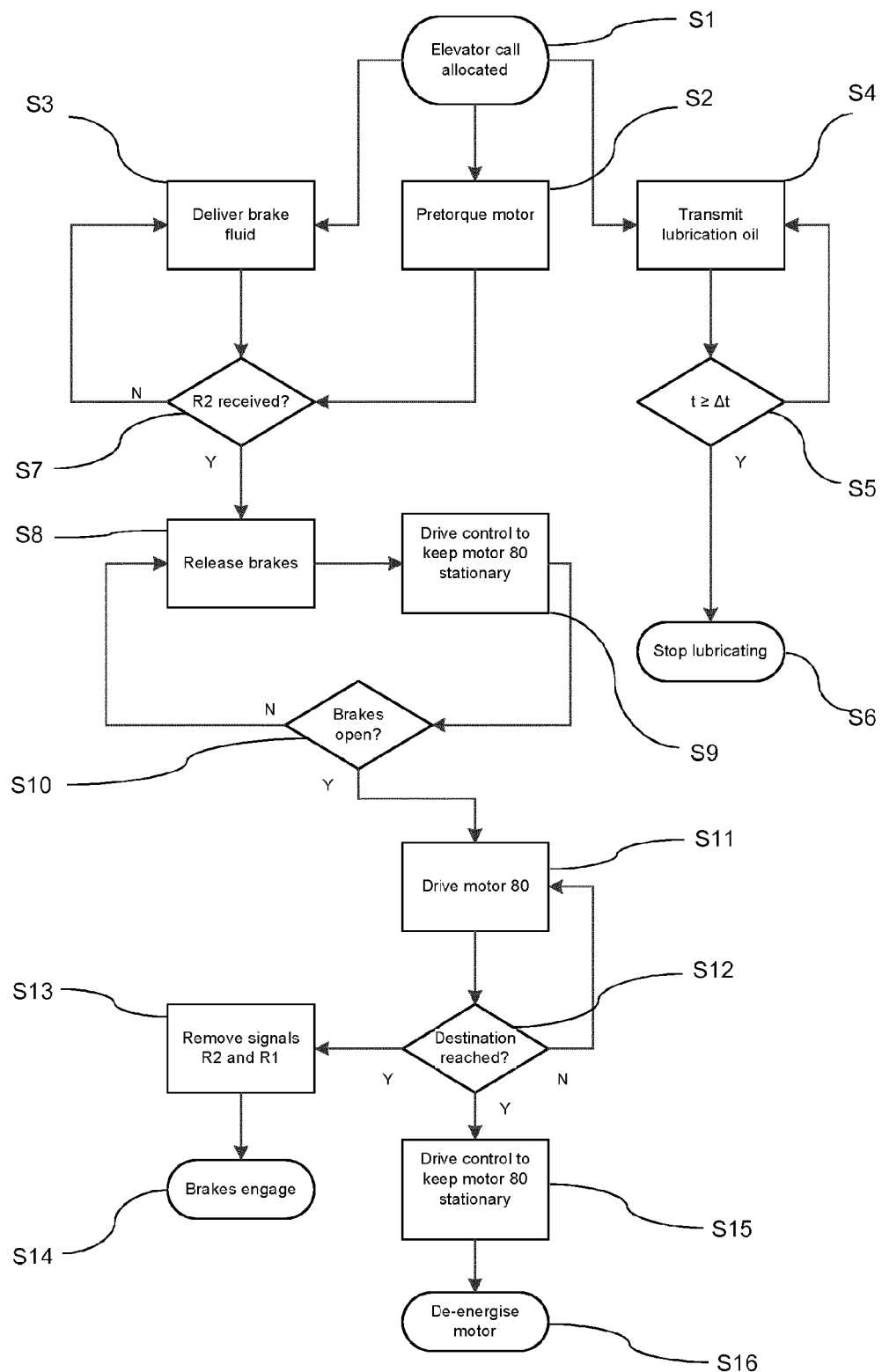
FIG. 4 is a flowchart illustrating a method of operating the elevator installation according to the preceding FIGS.

FIG. 4 is a flowchart illustrating a method of operating the elevator installation 1 according to the present invention wherein those steps aligned to the left of the drawing relate to brake operation, those in the middle are associated with motor operation and those to the right outline bearing lubrication.

The method begins at step S1 when the elevator controller 16 receives signals from conventional landing operating panels and car operating panels indicating that a passenger wishes to use the elevator 1 to travel between floors within a building. The controller 16 determines the travel path that the elevator 1 must undertake in order to satisfy the passengers' travel requests, and subsequently outputs signals to the drive 8.

Initially, at step S2, the drive 8 delivers electrical energy to the windings of the stator 82 via the terminal box 81 of the hoist machine 10 to pretorque the motor 80. Simultaneously, either the controller 16 or the drive 8 outputs the brake release signal R1 to both the automatic brake release unit 50 and the automatic lubrication device 100 initiating the delivery of brake fluid to the valve block 51 of the brake release unit 50 in step S3 and the transmission of pressurized lubrication oil to the top of the bearings 90 in step S4, respectively.

From this point onwards, the lubrication device 100 operates independently and after step S5, in which the motor 104 and a circulating pump 102 have been running for the preset time duration Δt, the lubrication device 100 automatically stops at step S6.

Meanwhile, after sufficient time has elapsed to enable adequate pressure build-up within the hydraulic braking fluid in the valve block 51, in step S7 the further release signal R2 is received by the 2/2 way solenoid valve 62 within the valve block 51 of the brake release unit 50. Accordingly, the pressurized brake fluid is now delivered to the brake cylinder 72 to initiate release of the brake calipers 70 from the brake disc 13 in step S8.

As the brakes are opening in step S8, the drive 8 continually receives positional information from a rotatory encoder attached, for example, to the shaft 88 of the machine 10. In step S9, the drive 8 uses this positional information to determine and deliver the electrical signals to the motor 80 in order to keep it stationary.

Furthermore, to prevent drag, whereby the motor 80 drives the shaft 88 and the brake disc 13 against partially open brakes 70, it is important to monitor the brake calipers 70. This is normally achieved using the brake contacts 75 that actuate when the calipers 70 are in the fully opened position. In the present example, the procedure loops around steps S8 and S9 until it is determined that the brake calipers 70 are fully open at step S10.

Subsequently, in step S11, the drive 8 controls and regulates the motor 80 to observe a travel profile to move the elevator car 2 within the hoistway 3 to ensure that the passenger within the car 2 is transported from his departure floor to his designation floor within the building at step S12.

After the elevator trip is complete, the method continues to step S13 in which the caliper brakes 70 grip or re-engage with the brake disc 13 of the hoist machine 10. In this step, the further release signal R2 from the controller 16 or the drive 8 is removed from the 2/2 way solenoid valve 62 within the valve block 51 of the automatic brake release unit 50. As a result, pressurized brake fluid in the brake cylinders 72 as well as any brake fluid still being pumped by the circulating pump 52 is drained back to the reservoir 56. Simultaneously or shortly thereafter, the release signal R1 is withdrawn and the electric motor 54 driving the pump 52 is de-energized. Accordingly, the brakes 70 are fully engaged with the brake disc 13 at step S14.

As the brakes are closing in step S13, the drive 8 continually receives positional information from the rotatory encoder to determine and deliver the electrical signals to the motor 80 in order to keep it stationary in step S15.

Finally, in step S16 the drive 8 de-energizes the electric motor 80 of the hoist machine 10.

The automatic lubrication device 100 can be set up such that rather than running for the preset time duration Δt after receipt of the brake release signal R1, it can continue running until the drive 8 or the elevator controller 16 transmits the further signal R2 used to control the solenoid valve 62 within the valve block 51 of the brake release unit 50. A further alternative is to keep the motor 104 and a circulating pump 102 of the lubrication device 100 operating until a signal is received from the brake contacts 75 in step S10 indicating that the brake calipers 70 are fully open.

Further details regarding the bearing 90 will be described hereinafter with reference FIG. 5A which is an exploded, axial cross-section A of the bearing 90 mounted in the second support pedestal 40 of the hoist machine 10 illustrated in FIG. 3A. It will be appreciated that a similar arrangement applies to the bearing 90 mounted in the first support pedestal 30.

The bearing 90 is mounted within a circular opening or seat 42 machined in the support pedestal 40. The bearing 90 comprises a cylindrical outer raceway 96 mounted to the pedestal 40, a cylindrical inner raceway 92 mounted to the motor shaft 88 and a plurality of spherical roller bearings 98 arranged between the inner and outer raceways 92 and 96. Accordingly, the bearing 90 forms an annulus between the shaft 88 and the opening 42 of the pedestal 30 having a thickness H2 defined as the difference between the diameter of the opening 42 and that of the shaft 88.

In the present example, a pair of circumferential arrays of rollers 98 are provided. Normally a cage is used for retaining the rollers 98 within the raceways 92 and 96 but for clarity within the drawing this element of the bearing 90 has been omitted.

To the right of the drawing the bearing 90 is axially retained in position between the pedestal 40 and the shaft 88 by a removable bearing end cap 120 according to the present invention which is conventionally secured, for example by bolts (not shown) extending through apertures 121 (see FIG. 5B), to the pedestal 40. A circular shaft seal 140 in accommodated in a recess on the end cap 120 to seal the bearing chamber. Although not shown in the drawing, it will be appreciated that to the other side, the bearing 90 can be likewise retained in position by either an identical end cap 120 or by a conventional end cap that can be a separate component or can be machined or cast within the pedestal 40.

At the upper portion of the bearing end cap 120, the oil feed pipe 112 from the automatic lubrication device 100 is connected to a nozzle 122 by a male/female hydraulic connector arrangement 124. The nozzle 122 opens into a recessed oil diffuser 123. As shown specifically in FIG. 5B which is a plan view along line B-B of the bearing end cap illustrated in FIG. 5A, the recessed oil diffuser 123 extends through an arc in the upper portion of the bearing end cap 120. The angle $\alpha 1$ through which the arc extends is dependent on the properties of the bearing oil used, in particular its viscosity, whereby for example the higher the viscosity then then greater the angle $\alpha 1$. Preferably, the angle $\alpha 1$ is at least 90°. As an alternative to the recessed oil diffuser 123, the oil feed pipe 112 from the lubrication device 100 can be connected to a plurality of nozzles 122 arranged in an arc in the upper portion of the bearing end cap 120.

Accordingly, when oil is transmitted to the top of the bearings 90 in steps S4 and S5 of the method as previously outlined with reference to FIG. 4, it is sprayed throughout the extent of the arc defined by the recessed oil diffuser 123 to coat the rollers 98 positioned within the upper region of the bearing 90. Gravity will induce excess oil to coat rollers 98 lower in the bearing 90.

Figure 3:
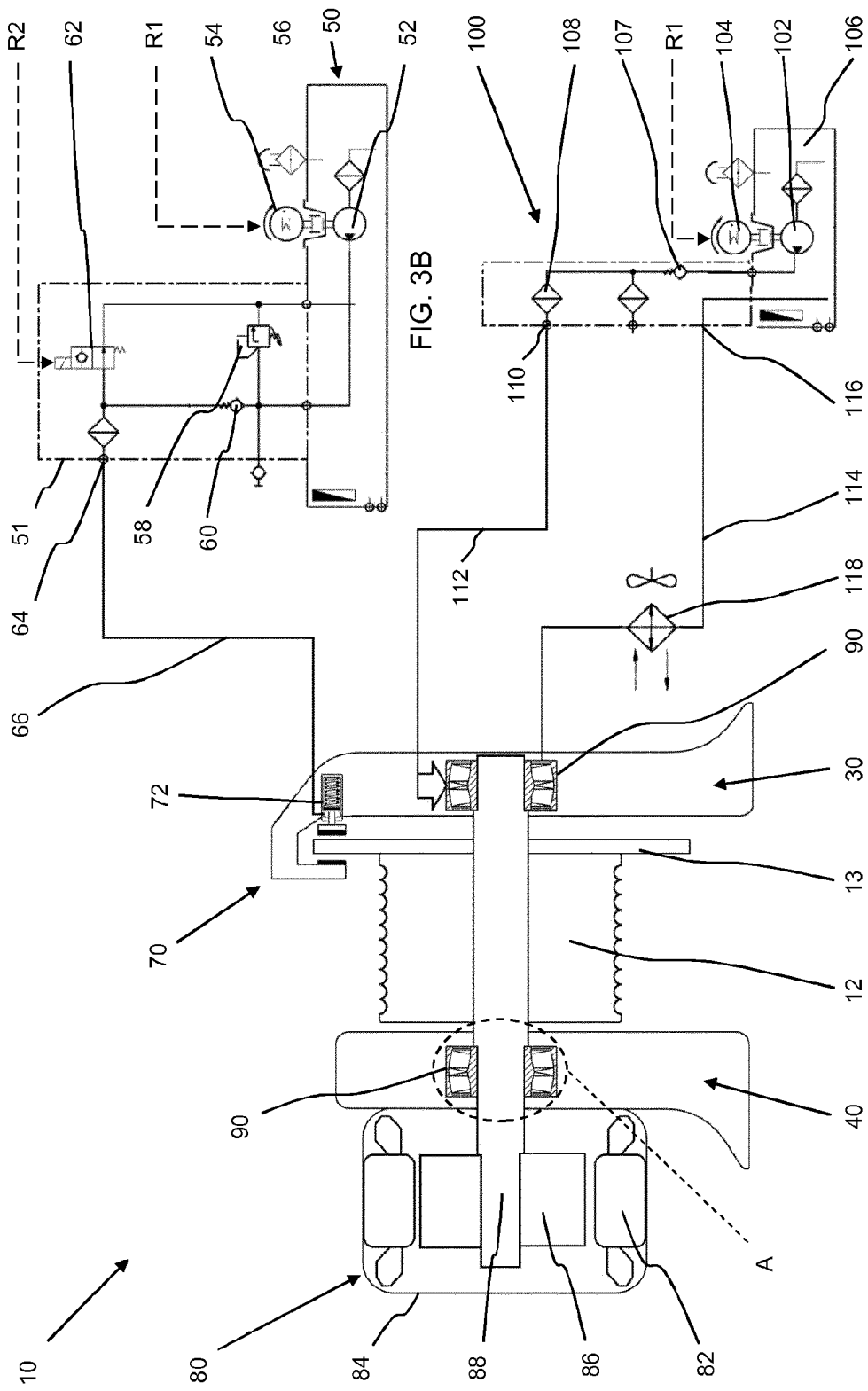
FIG. 3A shows an axial cross-section of the elevator hoist machine of FIG. 1 and FIG. 2.
FIG. 3B is a schematic of the automatic hydraulic brake release unit and illustrates its hydraulic connection to one of the brake calipers mounted to the elevator hoist machine of FIG. 3A.
FIG. 3C is similar to FIG. 3B illustrating the lubrication device and its hydraulic circuit to and from the bearing in the first support pedestal of the hoist machine.

The lower portion of the bearing end cap 120 contains an oil drainage channel 128 which communicates with the oil return pipe 114 via a drainage passage 130 and a male/female hydraulic connector arrangement 124. A flange 126 is provided in the end cap 120 between the bearing 90 and the oil drainage channel 128. Any oil accumulating in the lower portion of the bearing 90 in excess of the height H1 of the flange 126 will automatically overflow into the oil drainage channel 128 and from there back to the oil reservoir 106 in the lubrication device 100 through the oil return pipe 114 as illustrated in FIG. 3. The height H1 of the flange 126 will depend on the characteristics and properties of the bearing oil used but is preferably less than half the thickness H2 of the annulus formed by the bearing 90.

As with the recessed oil diffuser 123 in the upper part of the bearing end cap 120, the flange 126 and the oil drainage channel 128 can extend through an arc in the lower section of the end cap 120 as illustrated in FIG. 5B. The extent of the angle $\alpha 2$ of the arc should be great enough to permit any dirt or contamination in the oil to easily flow over the flange 126 and into the oil drainage channel 128 without causing blockage. Preferably, the angle $\alpha 2$ is less than 45°.

The removable bearing end cap 120 described above is only one of many examples that can be used in accordance with the present invention to deliver oil from the oil feed pipe 112 of the automatic lubrication device 100 to the bearing 90 and return excess oil through the oil return pipe 114 back to the lubrication device 100. The removable bearing end cap 120 can be particularly useful for example in modernizing an existing elevator machine. On the other hand, in new machines an annular channel or groove can be provided or machined in the support pedestal 30, 40 to deliver oil directly from the oil feed pipe 112 to the upper portion of the outer raceway 96 of the bearing 90.

Although the present invention has been described in conjunction with a hoist machine 10 having hydraulically released brakes 70, it will be appreciated that the invention is also equally applicable to elevator hoist machines employing brakes that are released electromagnetically.

Similarly, the present invention can be used in conjunction with brakes in the form of levers radially acting on a brake drum rather than calipers axially engaging the brake disc.

In the examples described above, the bearings support the traction sheave indirectly via the shaft to which the traction sheave is fixed. In is envisaged that the invention can be applied to an alternative arrangement within the hoist machine, wherein the bearings support a traction sheave rotating about a fixed, stationary shaft.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention. Rather, the scope of the invention is defined by the following claims and their equivalents.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator installation having an elevator controller, a drive and a hoist machine, the hoist machine comprising:
    a traction sheave;
    an electric motor rotating the traction sheave in response to signals from the drive;
    a brake for braking the traction sheave;
    at least one bearing supporting the traction sheave;
    a lubrication device automatically transmitting oil to the at least one bearing upon receipt of a brake release signal from the drive or from the controller; and
    wherein the brake is hydraulically released from braking the traction sheave and including a pump and a solenoid valve whereby the pump is activated by the brake release signal to deliver pressurized fluid from a reservoir to the solenoid valve and the solenoid valve is activated by a further brake release signal to deliver the pressurized fluid to the brake to hydraulically release the brake.

2. The elevator installation according to claim 1 wherein the lubrication device includes the pump being an inline oil pump transferring bearing lubrication oil from an oil reservoir and through an oil feed pipe to the bearing.

3. The elevator installation according to claim 1 wherein the lubrication device includes an oil return pipe draining excessive oil from the bearing to an oil reservoir.

4. The elevator installation according to claim 3 including a cooler in the oil return pipe between the bearing and the oil reservoir.

5. The elevator installation according to claim 1 including a bearing end cap positioned adjacent the at least one bearing and having at least one of an oil diffuser extending in an arc in an upper portion of the bearing end cap and a plurality of nozzles arranged in an arc in the upper portion.

6. The elevator installation according to claim 5 wherein the arc extends through an angle of at least 90°.

7. The elevator installation according to claim 5 wherein the bearing end cap includes an oil drainage channel separated from the at least one bearing by a flange in a lower portion of the bearing end cap.

8. The elevator installation according to claim 7 wherein the flange has a height that is less than half a thickness of an annulus formed by the at least one bearing.

9. The elevator installation according to claim 7 wherein the oil drainage channel and the flange extend through an arc having an angle of less than 45°.

10. A method for oil lubrication of at least one bearing in an elevator hoist machine comprising the steps of:
    monitoring for generation of an elevator brake release signal by an elevator controller or a drive associated with the hoist machine;
    delivering oil to the at least one bearing when the elevator brake release signal has been detected; and
    delivering the oil to the at least one bearing for a preset time duration, or until a signal generated from a brake contact confirms that an elevator brake of the hoist machine is open, or until a further brake release signal generated by the elevator controller or the drive is detected, or stopping the delivery of the oil to the at least one bearing before the elevator hoist machine starts to rotate a traction sheave.

11. The method according to claim 10 including draining excess oil from the at least one bearing.

12. The method according to claim 11 including cooling the excess oil being drained.

13. A method for oil lubrication of a bearing in an elevator hoist machine, the method comprising the steps of:
    providing a lubrication device adapted to deliver oil to the bearing of the hoist machine;
    monitoring for a generation of an elevator brake release signal by an elevator controller or a drive, the elevator controller and the drive being associated with the hoist machine;
    delivering oil from the lubrication device to the bearing in response to the detection of the elevator brake release signal; and
    delivering the oil to the bearing for a preset time duration, or until a signal generated from a brake contact confirms that an elevator brake of the hoist machine is open, or until a further brake release signal generated by the elevator controller or the drive is detected, or stopping the delivery of the oil to the bearing before the elevator hoist machine starts to rotate a traction sheave.

* * * * *